United States Patent
Sanches (10) Patent No.: US 9,219,660 B2
(45) Date of Patent: Dec. 22, 2015

(54) SELF-SERVICE TERMINAL

(71) Applicant: NCR CORPORATION, Duluth, GA (US)

(72) Inventor: Ricardo Faria Sanches, Dundee (GB)

(73) Assignee: NCR Corporation, Duluth, GA (US)

( * ) Notice: Subject to any disclaimer, the term of this patent is extended or adjusted under 35 U.S.C. 154(b) by 190 days.

(21) Appl. No.: 13/628,861

(22) Filed: Sep. 27, 2012

(65) Prior Publication Data

US 2014/0089404 A1   Mar. 27, 2014

(51) Int. Cl.

| | |
|---|---|
| G06F 15/16 | (2006.01) |
| H04L 12/26 | (2006.01) |
| H04L 29/06 | (2006.01) |
| H04L 12/24 | (2006.01) |
| G07F 19/00 | (2006.01) |
| G06Q 20/18 | (2012.01) |
| H04L 12/58 | (2006.01) |

(52) U.S. Cl.
CPC ............. *H04L 43/00* (2013.01); *G06Q 20/18* (2013.01); *G07F 19/209* (2013.01); *H04L 41/026* (2013.01); *H04L 43/0817* (2013.01); *H04L 65/1006* (2013.01); *H04L 65/1093* (2013.01); *H04L 51/046* (2013.01)

(58) Field of Classification Search
CPC ................. H04L 65/1006; H04L 65/1093
USPC ......... 709/204, 205, 206, 223, 224, 227–229; 705/1.1; 713/154
See application file for complete search history.

(56) References Cited

U.S. PATENT DOCUMENTS

| | | | |
|---|---|---|---|
| 6,646,564 B1 * | 11/2003 | Azieres et al. ................ 340/679 |
| 7,640,066 B2 * | 12/2009 | Rayburn et al. ................ 700/17 |
| 7,734,909 B1 * | 6/2010 | Roush et al. ................ 713/154 |
| 8,015,455 B1 * | 9/2011 | Vannatter et al. ............... 714/48 |
| 2003/0204756 A1 * | 10/2003 | Ransom et al. ............... 713/300 |
| 2004/0137897 A1 * | 7/2004 | Teixeira ........................ 455/423 |
| 2005/0216565 A1 * | 9/2005 | Ito et al. ........................ 709/206 |
| 2006/0253539 A1 * | 11/2006 | Casperson et al. ............. 709/207 |
| 2007/0292145 A1 * | 12/2007 | Drose et al. ........................ 399/8 |
| 2008/0301239 A1 * | 12/2008 | Khijniak et al. ............. 709/206 |
| 2009/0063677 A1 * | 3/2009 | Forlenza et al. ............. 709/224 |
| 2010/0246800 A1 * | 9/2010 | Geppert et al. .......... 379/265.09 |
| 2010/0299392 A1 * | 11/2010 | Chiou ........................... 709/206 |

* cited by examiner

*Primary Examiner* — Hieu Hoang
(74) *Attorney, Agent, or Firm* — Joseph P. Mehrle (57) ABSTRACT

A method and apparatus are disclosed for determining a status of a Self-Service Terminal (SST) in a financial network. The method includes the steps of, from an SST comprising a node of a financial network, providing an instant message identifying a status of the terminal to a help desk terminal comprising a further node of the financial network.

15 Claims, 6 Drawing Sheets

SELF-SERVICE TERMINAL

FIELD OF THE INVENTION

The present invention relates to a method and apparatus for monitoring and controlling a Self-Service Terminal (SST). In particular, but not exclusively, the present invention relates to monitoring and controlling the operational status of an SST, such as an Automated Teller Machine (ATM).

Many networks are known in which multiple Self-Service Terminals (SSTs) are connected together for use by members of the public or members of an organization.

For example, many SSTs in the form of Automated Teller Machines (ATMs) are networked together as part of a financial network. The ATMs which form nodes or network end points may be located in bank branches, in building lobbies or other sites spread out over a city or country.

Management of such networks is often a complex and costly issue for those concerned with such matters. Typically, dedicated systems are required to collect data such as status information and/or level of consumables or the like from the SSTs and to transmit this data to a network management centre. The transmitted data is then displayed on a user interface at a terminal for a human operator to see. The human operator is thereafter allowed to remotely interface with the SST.

Even in circumstances where such costly and complex management systems exist, action can be delayed due to constraints imposed upon the overall network by the system. For example, in the event that an SST located in a bank branch requires attention, the existence of this fault is conventionally first reported to a network management centre in the system. From here, the information is re-relayed to branch staff at the location where the faulty SST is located. This may occur automatically or manually. Branch staff must then receive the information and then act to correct a fault. Most of the time the information is "dispatched". That is to say, there is no immediate confirmation that the branch staff have received the information and are acting upon it. Also, according to conventional systems, the information flow is usually one way only; that is to say, from the network management centre to dispatched operators. Conventional systems often limit the way in which users outside of the network management centre can interface with the SSTs to collect status information and attempt to correct malfunctions.

SUMMARY OF THE INVENTION

It is an aim of the present invention to at least partly mitigate the above-mentioned problems, or other problems associated with prior art SSTs.

It is an aim of certain embodiments of the present invention to utilize an instant message protocol as a way to monitor a network or a part of a network and to enable SSTs like ATMs, kiosks or the like to report their status and to receive commands used to correct malfunctions or change an operational state.

It is an aim of certain embodiments of the present invention to provide a central help desk terminal with instant presence information identifying when one or more terminals in a network are operational and to provide a user based locally or remotely with an efficient and straightforward way to monitor malfunction and attempt to correct the malfunction.

It is an aim of certain embodiments of the present invention to enable a network such as a financial network which includes a monitoring function to be continually updated with real time messages so that malfunction or other network statistic information can be continually updated and reacted to in a prompt and efficient manner.

According to a first aspect of the present invention there is provided a method of determining a status of at least one Self Service Terminal (SST) in a financial network, comprising the steps of:
  from a node of a financial network, providing an instant message identifying a status of an SST to a help desk terminal comprising a further node of the financial network.
  Aptly, the method further comprises the steps of:
  responsive to the instant message, sending a command comprising a further instant message from the help desk terminal to the SST;
  executing the command at the SST; and
  sending a status update comprising a still further instant message from the SST to the help desk terminal.
  Aptly, the method further comprises sending a command to the SST via an instant message comprising an SST specific header element.
  Aptly, the method further comprises additionally sending the command to a monitoring terminal comprising a still further node of the financial network.
  Aptly, the method further comprises sending a command to the monitoring terminal via an instant message comprising a monitoring terminal specific header element.
  Aptly, the method further comprises the steps of, if the status update comprises a command failed message, sending a dispatch command comprising an instant message to a user terminal of at least one field engineer associated with the financial network.
  Aptly, the method further comprises sending a dispatched message comprising an instant message to at least the help desk terminal when a field engineer is dispatched to the SST responsive to the dispatch command.
  Aptly, the method further comprises sending the dispatched message to the SST and to a supervisor terminal comprising a supervisor node of the financial network at a location where the SST is located.
  Aptly, the method further comprises sending an arrived command comprising an instant message from a field engineer user terminal to a monitoring terminal comprising a monitoring node of the financial network.
  Aptly, the method further comprises the steps of:
  associating each terminal in the financial network with a unique IP address; and
  at the help desk terminal, associating each IP address with a respective contact name and storing each contact name in a contact list.
  Aptly, the method further comprises the steps of:
  associating each of a plurality of field engineer user terminals and at least one monitoring terminal with a respective unique support IP address; and
  at the help desk terminal, associating each support IP address with a respective contact name and storing each contact name in a contact list.
  It should now be appreciates that embodiments according to this aspect have the advantage that instant messages can be utilized to identify the status of an Automated Teller Machine (ATM) (or other SST) and can issue commands to try to correct any malfunction that is detected in real-time.

According to a second aspect of the present invention there is provided a financial network, comprising:
  at least one Self-Service Terminal (SST), comprising a node in a financial network, comprising an instant message (IM) client or IM agent; and at least one help desk terminal, comprising a node in the financial network, comprising an IM client; wherein a status of the SST is identifiable to the help desk node via an instant message.

Aptly, each IM client comprises a software agent, running on a respective terminal, that is connectable to an IM server.

Aptly, the financial network further comprises at least one IM server comprising a node in the financial network.

According to a third aspect of the present invention there is provided a method of communicating information from a self-service terminal on a network, comprising: executing an instant message program at the self-service terminal; and communicating via the instant messaging program with at least one other device on the network.

The other devices may be other self-service terminals, servers, mobile devices (such as cellphones), or the like.

According to a fourth aspect of the present invention there is provided a product which comprises a computer program comprising program instructions for determining a status of at least one Self-Service Terminal (SST) in a financial network by, from a node of a financial network, providing an instant message identifying a status of an SST to a help desk terminal comprising a further node of the financial network.

Certain embodiments of the present invention provide a smaller and/or light and/or less expensive and/or more flexible system for network management than conventional systems.

Certain embodiments of the present invention provide a network management tool that can complement existing systems and which can provide an affordable solution to the management of networks.

Certain embodiments of the present invention utilize an instant messaging (IM) solution whereby terminals appear as "friends" on an IM console of a technician, branch manager, help desk operator or other such stakeholder that is concerned with the operation of that SST and that has the security credentials to connect to the SST or instruct someone who has. Such stakeholders may be located locally or remotely with respect to the SST.

Certain embodiments of the present invention provide a mechanism whereby operation of multiple terminals can be monitored in real time. Attempts can be made to correct any detected malfunction in a prompt fashion, and if such attempts fail, local service personnel or field engineers can be dispatched to correct the error in a prompt and observable manner.

BRIEF DESCRIPTION OF DRAWINGS

Embodiments of the present invention will now be described hereinafter, by way of example only, with reference to the accompanying drawings in which.

DESCRIPTION OF EMBODIMENTS

In the drawings like reference numerals refer to like parts.

Figure 1:
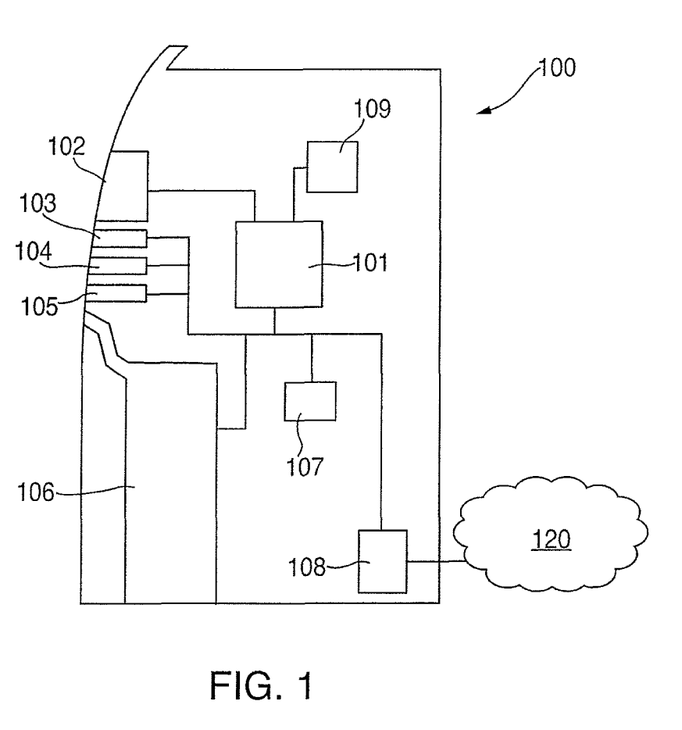
FIG. 1 illustrates an ATM connected to a network.

FIG. 1 illustrates a block diagram of a Self-Service Terminal (SST) 100 in the form of an Automated Teller Machine (ATM) according to an embodiment of the present invention. It will be understood that certain embodiments of the present invention are applicable to many different types of terminal such as ATMs, vending machines, Teller Cash Recyclers (TCRs), change machines, kiosks, Fast Lane POS and the like. Typically, in an ATM a sheet like item of media is to be moved from one location to another. Likewise, items of media such as, but not limited to, currency notes, checks, tickets, giros and the like may be deposited at and/or dispensed from such terminals.

The ATM 100 includes different modules for enabling transactions to be executed and recorded by the ATM 100. These ATM modules include customer transaction modules and service personnel modules. The ATM modules include an ATM controller 101, a customer display 102, a card reader/writer module 103, an encrypting keypad module 104, a receipt printer module 105, a cash dispenser/deposit module 106, a journal printer module 107 for creating a record of every transaction executed by the ATM, a connection module 108, an operator panel module 109 for use by a service operator (such as a field engineer, a replenisher (of currency, of printer paper or the like), or the like).

Certain customer transaction modules (such as the ATM controller 101) are also used by the service personnel for implementing management functions. However, some of the modules are referred to herein as service personnel modules (such as the journal printer module 107 and the operator panel module 109) because they are never used by ATM customers. The ATM 100 is a node or network end point in an overall financial network. The ATM 100 is connected to the remainder of the financial network via a connection to the internet 120. It will be appreciated that the ATM 100 could alternatively be connected to the remainder of the financial network via an intranet or other connection network.

Figure 2:
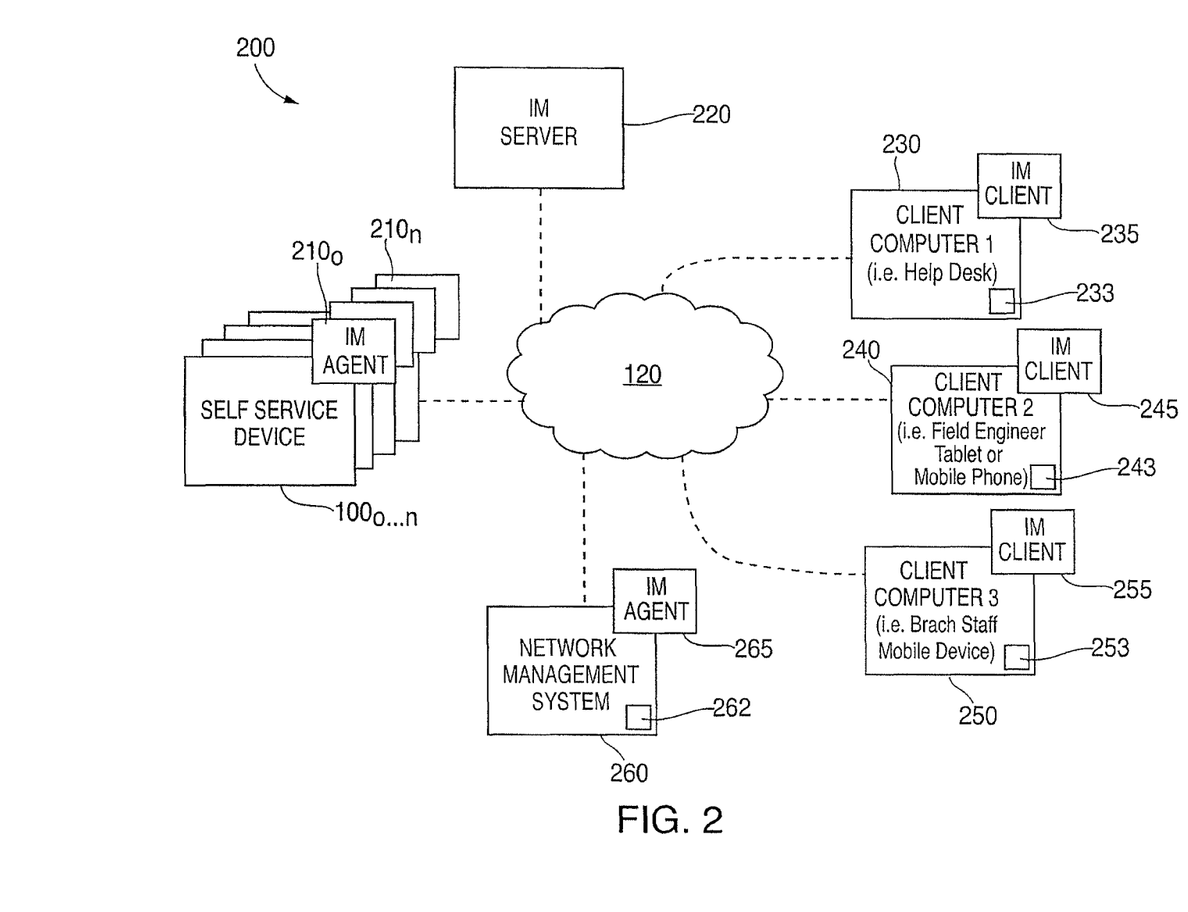
FIG. 2 illustrates a financial network according to an embodiment of the present invention.

FIG. 2 illustrates a financial network 200 in more detail. As illustrated in FIG. 2, the financial network 200 includes one or more ATMs $100_{0 \ldots n}$. Each ATM is a self-service device. It will be appreciated that according to certain other embodiments of the present invention the self-service device may be a kiosk, Fast Lane POA or any other self-service device. Each ATM $100_{0 \ldots n}$ includes an instant messaging agent $210_{0 \ldots n}$. An instant messaging agent is a software agent on the controller 101 of a respective ATM which is capable of connecting to an instant messaging (IM) server 220 for the exchange of instant messages. Such exchange may, for example, follow the extensible messaging and presence protocol (XMPP) or other such protocol that enables instant messaging.

XMPP is an open extensible mark-up language (XML) protocol for near-real time messaging, presence and request-response services in which clients communicate with one or more servers 220. Optionally, a gateway that translates between XMPP and protocols used on a foreign messaging network are provided so that communication can occur with a client on a foreign (non-XMPP) messaging network via the foreign messaging network. The server 220 acts as an intelligent abstraction layer for XMPP communications. The server 220 manages connections from or sessions for other entities in the form of XML streams to and from authorized clients, servers and other entities. The server 220 also routes appropriately addressed XML stanzas among other entities over XML streams. Aptly, the XMPP-compliant server 220 is responsible for the storage of data used by clients. For example, client lists for users of XMPP-based instant messaging and present applications are stored on the server 220. Optionally, each or some of the clients may store such information locally. The IM server 220 is thus a server capable of offering instant messaging services. Examples of publicly available servers include Microsoft Windows Live Messenger, Google Talk, Jabber or the like. The IM server may be a public one connected to the internet 120 as shown in FIG. 2 or optionally a privately developed IM server 220 connected via the internet or an intranet.

Clients connect directly to the server 220 over a secure connection such as a TCP connection or the like and use XMPP functionality. As noted above, an optional gateway is utilized which is a special-purpose server-side service that translates XMPP into a protocol used by a foreign (non-XMPP) messaging system. Each ATM $100_{0...n}$ and/or server 220 can be considered as a network end point and is allocated a unique ID on the network. Each network end point can communicate with each other using XMPP. All such entities are uniquely addressable in a form that is consistent with RFC 2396. Aptly, the address of an XMPP entity is a Jabber identifier (JID). Each JID contains a set of ordered elements formed by a domain identifier, a node identifier and a resource identifier. Other addressing schemes could of course be utilized according to certain other embodiments of the present invention.

Also shown in the financial network 200 in FIG. 2 is a help desk terminal 230 which includes a Graphical User Interface (GUI) 233 and a client computer. This is a computer device running a respective IM client 235 which can thus send and receive instant messages. It will be understood that the ATM $100_{0...n}$ has been described as having an IM agent $210_{0...n}$. An IM agent can communicate via instant messages but is programmed to send and receive instant messages without having a user interface. By contrast IM clients typically utilize a Graphical User Interface (GUI) so that human operators can select actions. It will be appreciated that an ATM could be provided with a GUI in which case it may be referred to as an IM client.

The IM client implementations may optionally be one of Microsoft Messenger, Google Talk, Skype, Yahoo Messenger or the like. The financial network 200 also includes one or more user terminals 240 utilized by a field engineer. Each field engineer is a skilled stakeholder that may be dispatched to an ATM requiring service. The user terminal of the field engineer may be a tablet or mobile phone or the like. The user terminal 240 has a GUI 243. The client computer of the user terminal 240 is a computer device running an IM client 245 and as such can send/receive instant messages. Optionally, the IM client 245 implements Microsoft Messenger, Google Talk, Skype, Yahoo Messenger or the like.

The financial network 200 also includes one or more mobile user terminals 250 which are usable by branch staff members of a bank branch. Each mobile terminal 250 which may be a smart phone, tablet or mobile phone or the like and includes a GUI 253 and a computer device running a respective IM client 255 that can send/receive instant messages. Optionally, the IM client 255 of the mobile terminal implements Microsoft Messenger, Google Talk, Skype, Yahoo Messenger or the like. The branch staff member acts as a supervisor having a supervisor terminal (the mobile phone 250 or PC etc) and is located locally where one or more of the ATMs $100_{0...n}$ are located.

The financial network 200 also includes a network management system 260 which is an incident management network and operational data management system. Aptly, the network management system 260 carries out a monitoring role and includes a GUI 262 which enables an authorized user to monitor in real time operation of the overall financial network. The GUI 262 thus allows easy operation and "at a glance" monitoring of key performance indicators (KPIs). The network management system 260 also includes a computer device running an IM client 265. The NCR APTRA Vision system is an example of a network management system 260. The IM client 265 can send and receive instant messages. The IM client implementations may optionally be one of Microsoft Messenger, Google Talk, Skype, Yahoo Messenger or the like.

On power-up, the self-service device $100_{0...n}$, utilizing the IM agent $210_{0...n}$ registers itself with the IM server 220. Each self-service device $100_{0...n}$ has a logical IM name. That is to say, a name in a natural state such as "ATM0001" or "ATM near CTO office". Other naming structures could of course be utilized.

On power-up, any one of the help desk terminal 230, field engineer phone 240, branch staff mobile telephone 250, using a respective IM client 235, 245, 255, registers itself with the IM server 220. The respective client computer asks to add "ATM0001" to its list of IM contacts. The self-service $100_{0...n}$ device consults a list of approved IM contacts to validate the request from whichever client computer has made the request and is thus a requestor. If the client computer requestor is validated, then the self-service device $100_{0...n}$ grants the client computer permission to be accessed via instant messaging. The self-service device $100_{0...n}$ is added to an IM contacts list for the client computer.

Each self-service device $100_{0...n}$ can send a "status change" message to the IM server 220 if, for example, it detects a hardware failure and/or becomes unable to offer services. The IM server 220 communicates this status change to an appropriate client computer such as that of the help desk 230. An operator using the GUI 233 notified of the status change will notice this status change and send an instant message to the self-service device $100_{0...n}$. This instant message may be a command. The self-service device $100_{0...n}$ receives the instant message via the IM agent $210_{0...n}$ and interprets the message. If appropriate, a response is sent to the client computer sending the instant message. This response may contain detailed status information or the outcome of an executed command or a list of available commands or any other instructions supported by the IM agent 210 in the particular self-service device 100.

At any time, the client computer 230, 240, 250 can invite other IM users connected to the network to join the conversation with the self-service device $100_{0...n}$. For example, the "help desk" terminal 230 client computer may invite a "field engineer" terminal 240 to the instant message conversation with self-service device $100_{0...n}$. The "field engineer" may assist the "help desk" with problem resolution or the help desk can transfer the issue to a field engineer. Optionally, the network management system 260 may also be connected via instant messaging to the other terminals in the network 200. The network management system 260 may, for example, receive an IM message from a self-service device $100_{0...n}$, register an incident "open a ticket", send an IM message to "field engineer" provided by the field engineer terminal 240 to dispatch a field engineer to attend the self-service device $100_{0...n}$. Optionally, when an issue is resolved the field engineer may send an IM message to the network management system 260 to inform that the problem has been resolved "close the ticket".

Figure 3:
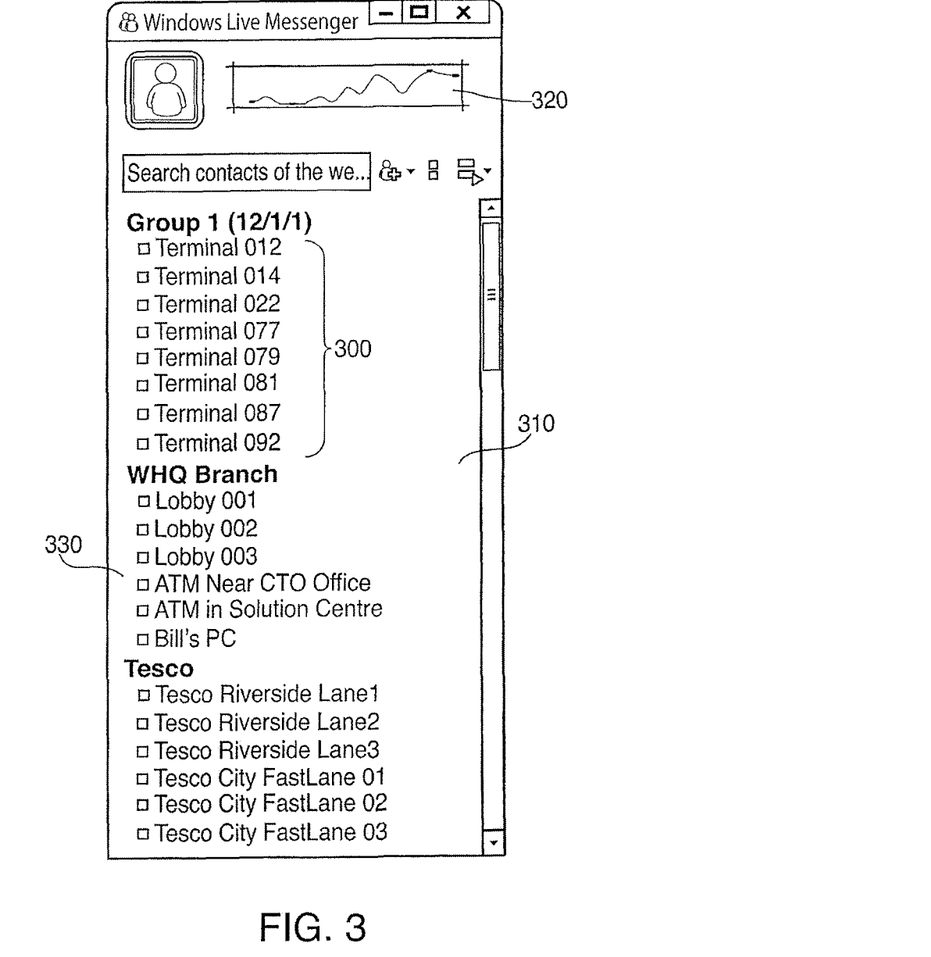
FIG. 3 illustrates grouping of instant messaging "friends" in the form of multiple ATMs.

FIG. 3 helps illustrate how instant messaging protocols may be utilized to monitor a network or subset of a network. Terminals or "things" like ATMs and other self-service devices are treated as "friends" in an IM directory. These "things" may be interacted with. They can report their status and send messages. Their messages can be responded to and requests sent to them and other interested parties can be invited to have chats with multiple entities about a particular event.

As illustrated in FIG. 3, a user can group a number of terminals into a group 300 which they find convenient when looking at a graphical user interface 310. For example, static groups are shown in FIG. 3. Optionally, the GUI 310 includes a performance parameter display region 320 which shows a trend or other such information such as traffic lights, smiley faces or the like to indicate how the help desk operator is performing. A user may also use aliases to identify terminals. For example, "ATM near CTO office" would be an ATM in the worldwide headquarters of a branch. This alias 330 may be utilized instead of only using an ATM ID. It will be appreciated that some contacts could of course be "real" people like a help desk supervisor, customer, field engineer or other operator or the like.

Figure 4:
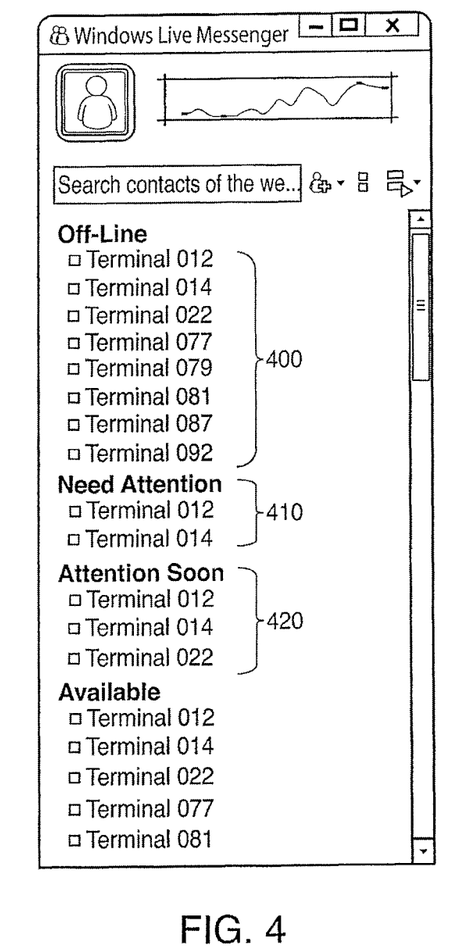
FIG. 4 illustrates how the presence of a "friend" can be used to indicate a status of that terminal.

FIG. 4 helps illustrate how a system can be utilized to include "dynamic groups". For example, as shown in FIG. 4, a first dynamic group 400 indicates terminals which are offline. A further group 410 indicates terminals which need attention and a still further group 420 indicates terminals which are predicted to require attention in the short to midterm. Terminals optionally automatically move from one group to another according to their "status". This can be achieved in real-time. It will be appreciated that certain authorized people, like bank branch staff or store staff, can add their local terminals as "friends" and monitor how they are performing.

Figure 5:
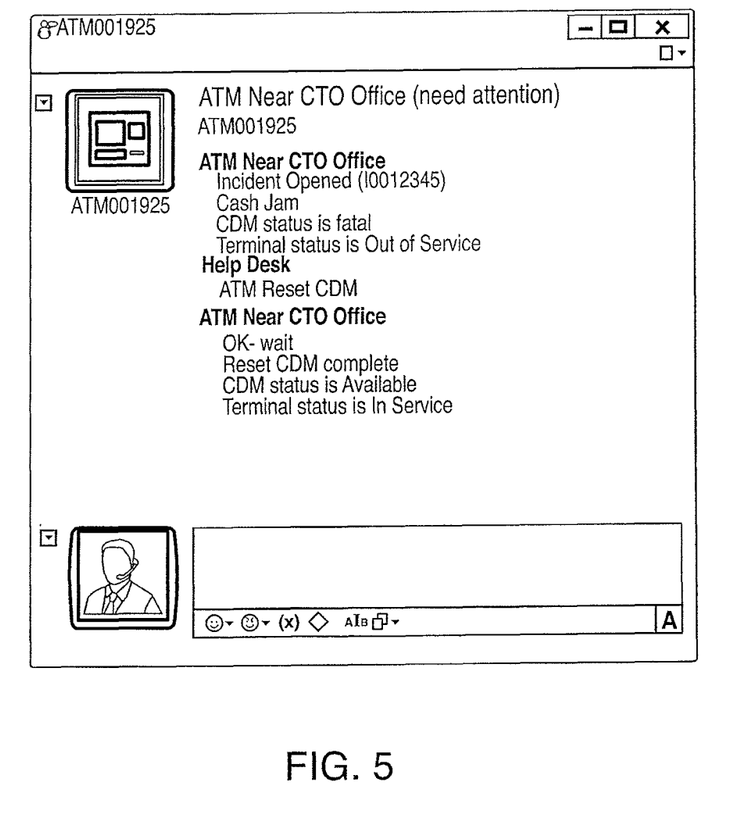
FIG. 5 illustrates a workflow of messages utilized to clear a cash jam at an ATM.

FIG. 5 helps illustrate an example of operation for the system. An ATM which is labelled as "ATM near CTO office" reports a cash jam via an IM message. An IM session between the ATM 100 and the help desk terminal 230 is initiated. The help desk user can send a command to the ATM in a "natural" language. For example, the command starts with "ATM". The ATM IM agent detects and acknowledges receipt of the command with an "OK-wait". The ATM thereafter executes the command and returns a sensible response also in a "natural" language. For example, response indicates that a CDM reset has been completed and the CDM status has been marked as now available rather than as status fatal. The entire "dialogue" is visible on the screen and is optionally logged. Examples of commands which could be utilized are set out below in Table 1.

TABLE 1

| | |
|---|---|
| ATM: status | Returns terminal status (in/out of service, in supervisor) |
| ATM: CDM status | Returns CDM status (applicable to all other devices) |
| ATM: Get Cassette Count | Returns all cassette counts |
| ATM: Upload EJ | Creates and uploads EJ.XML file |
| ATM: Upload Logs | Creates and uploads LOGS.ZIP file |
| ATM: Enter Supervisor | Enters/attempts to enter supervisor mode |
| ATM: Exit Supervisor | Exits/attempts to exit supervisor mode |
| ATM: Get Sw Version | Returns software inventory information |
| ATM: Upload Inventory | Creates and uploads INVENTORY.ZIP file |

Figure 6:
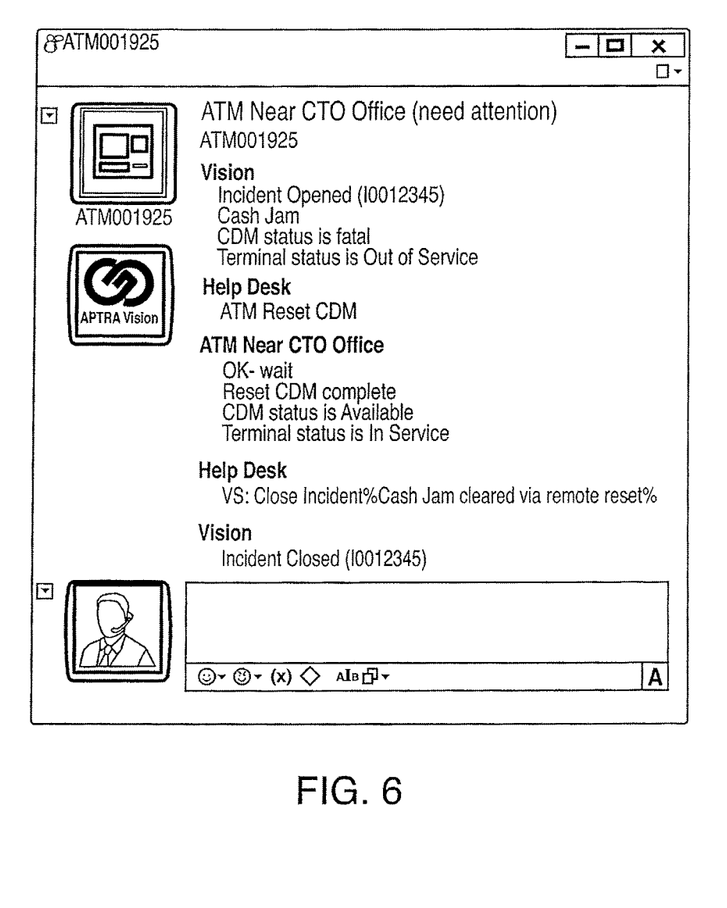
FIG. 6 illustrates a workflow of messages between an ATM, a Help Desk and a Network Management System.

Natural language processor can support variations such as:
Variations for "ATM: status" command:
ATM: what is your status?
ATM: return status report
ATM: report status Variations for "ATM: Get Cassette Counts" command:
ATM: get counts
ATM: what is your cassette count?
ATM: what are your cassette counts?
Variations for "ATML Upload EJ" command:
ATM: upload EJ file
ATM: upload Journal FIG. 6 illustrates an alternative embodiment of the present invention in which the network management system 260 (referred to in this example as "Vision") identifies an actual problem with an SST 100 or potential problem with an SST 100 and initiates action. For example, when the network management system 260 identifies the occurrence of a predetermined event (which might be that no transactions have been detected in the last two hours or when a human person has made a telephone call to inform someone that an ATM is not working or when a system that authorizes transactions has reported a potential problem with the particular ATM 100 or when the ATM 100 has reported a fault via another protocol like SNMP, or the like) then an instant message is sent to the help desk terminal 230 indicating a likely, possible or actual malfunction. The network management system 260 creates an "incident" to track the problem and alerts the help desk node 230 via an instant message. Subsequently the help desk node 230 communicates via an instant message with both the ATM 100 which has been identified as faulty and with the network management system 260. For example, as shown in FIG. 6, the help desk node 230 uses instant messaging to send a command to the respective ATM 100. The command illustrated is "reset CDM". Other commands could of course be utilized according to the fault that has been reported or which is estimated to have occurred based on the information known. Subsequent to receiving the command the ATM initiates, and in the example shown, successfully executes the command and communicates the result back to the help desk. Again, this is via instant messaging with a message "Terminal status is in service" being sent. Having received this command the help desk node 230, via instant messaging, sends a command to the network management system 260 notifying that the problem has been resolved and that the incident can be closed. For example, the help desk node 230 provides the instant message text "cash jam cleared via remote reset". This provides a short explanation of how the problem was resolved. The message also instructs that the incident report should be closed. Optionally, the entire instant message conversation is logged as part of incident resolution. The network management system node 260 responds confirming that the incident has been closed with an instant message having a text "incident closed".

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of determining a status of at least one Self Service Terminal (SST) in a financial network, comprising the steps of:
   sending a query instant message to the SST requesting a status of the SST from a node of the financial network, wherein the query instant message is in a natural language format and represents a command for processing by the SST;
   receiving the status as an instant message from the SST in response to the query instant message, wherein the status is in the natural language format;
   from the node of the financial network, providing the instant message identifying the status of the SST to a help desk terminal comprising a further node of the financial network.

2. The method as claimed in claim 1, further comprising the steps of:
   responsive to the instant message, sending a command comprising a further instant message from the help desk terminal to the SST;
   executing the command at the SST; and
   sending a status update comprising a still further instant message from the SST to the help desk terminal.

3. The method as claimed in claim 2, further comprising the steps of:
   sending the command to the SST via an instant message comprising an SST specific header element.

4. The method as claimed in claim 2, further comprising the steps of:
   additionally sending the command to a monitoring terminal comprising a still further node of the financial network.

5. The method as claimed in claim 4, further comprising the steps of:
   sending a command to the monitoring terminal via an instant message comprising a monitoring terminal specific header element.

6. The method as claimed in claim 2, further comprising the steps of:
   if the status update comprises a command failed message, sending a dispatch command comprising an instant message to a user terminal of at least one field engineer associated with the financial network.

7. The method as claimed in claim 6, further comprising the steps of:
   sending a dispatched message comprising an instant message to at least the help desk terminal when a field engineer is dispatched to the SST responsive to the dispatch command.

8. The method as claimed in claim 7, further comprising the steps of:
   sending the dispatched message to the SST and to a supervisor terminal comprising a supervisor node of the financial network at a location where the SST is located.

9. The method as claimed in claim 8, further comprising the steps of:
   sending an arrived command comprising an instant message from a field engineer user terminal to a monitoring terminal comprising a monitoring node of the financial network.

10. The method as claimed in claim 1, further comprising the steps of:
    associating each terminal in the financial network with a unique IP address; and
    at the help desk terminal, associating each IP address with a respective contact name and storing each contact name in a contact list.

11. The method as claimed in claim 1, further comprising the steps of:
    associating each of a plurality of field engineer user terminals and at least one monitoring terminal with a respective unique support IP address; and
    at the help desk terminal, associating each support IP address with a respective contact name and storing each contact name in a contact list.

12. A financial network, comprising:
    at least one Self-Service Terminal (SST), comprising a node in the financial network, comprising an instant message (IM) client or IM agent; and
    at least one help desk terminal, comprising second node in the financial network, comprising a second IM client; wherein
    a status of the SST is identifiable to the help desk terminal via an instant message in a natural language format and the help desk terminal configured and adapted to invite at least one other party to a conversation relevant to the instant message and the SST configured and adapted to dynamically change from a first group having first SSTs to a second group with second SSTs based on the status.

13. The financial network as claimed in claim 12, further comprising:
    each IM client comprises a software agent, running on a respective terminal, that is connectable to an IM server.

14. The financial network as claimed in claim 12, further comprising:
    at least one IM server comprising a third node in the financial network.

15. A method of communicating information from a networked self-service terminal, the method comprising:
    executing an instant message program at the self-service terminal; and communicating via the instant messaging program with at least one other device on the network in response to a query instant message requesting a status from the self-service terminal sent by the at least one other device, and wherein the query instant message is in a natural language format, and wherein communicating further includes communication through instant messages in the natural language format.

* * * * *